Aug. 4, 1953 W. J. BISHOP ET AL 2,647,563
COLLAPSIBLE BLEACHER TYPE BACK REST
Filed Jan. 8, 1951 3 Sheets-Sheet 2
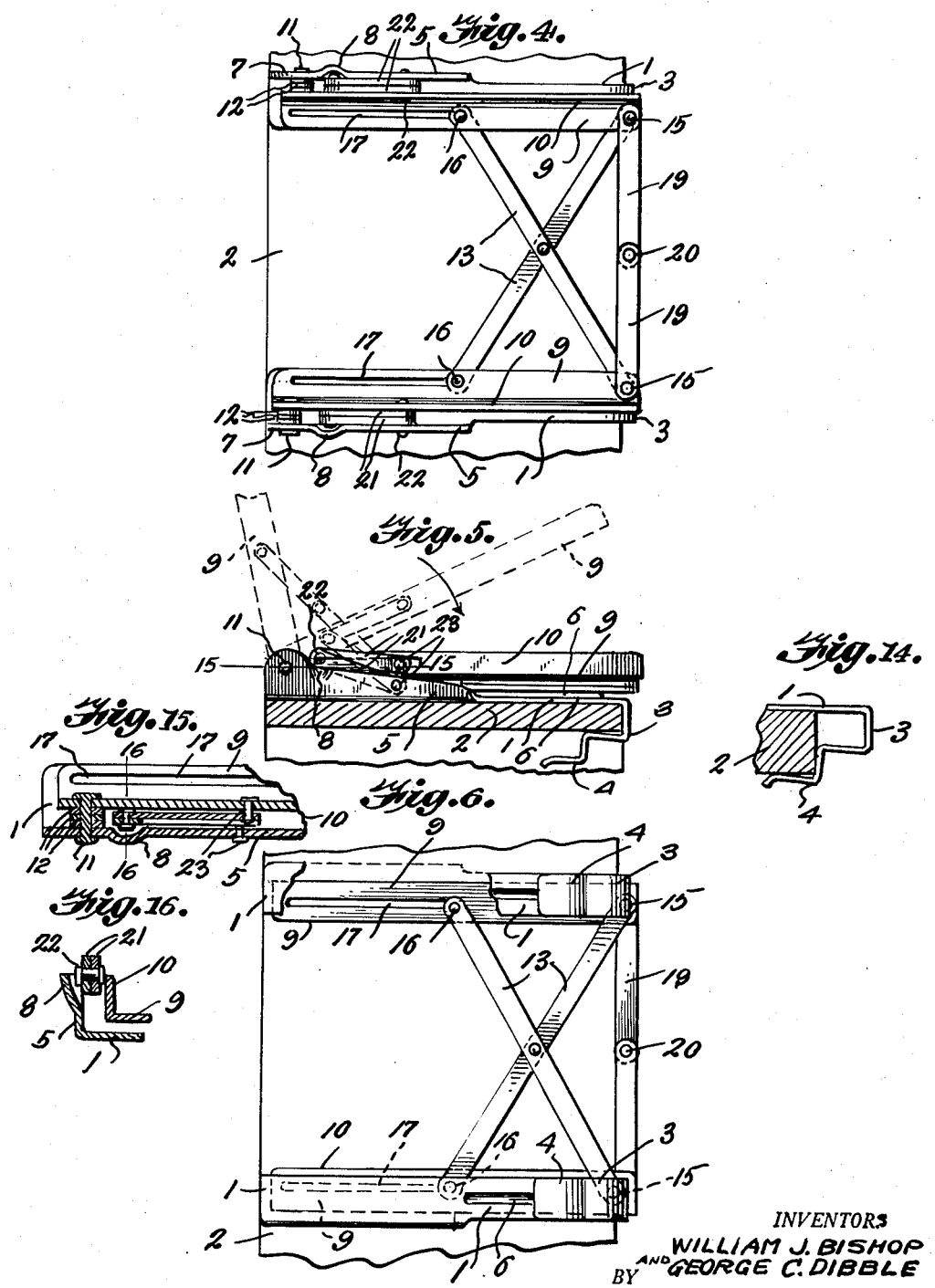
INVENTORS
WILLIAM J. BISHOP
AND GEORGE C. DIBBLE
BY
ATTORNEY

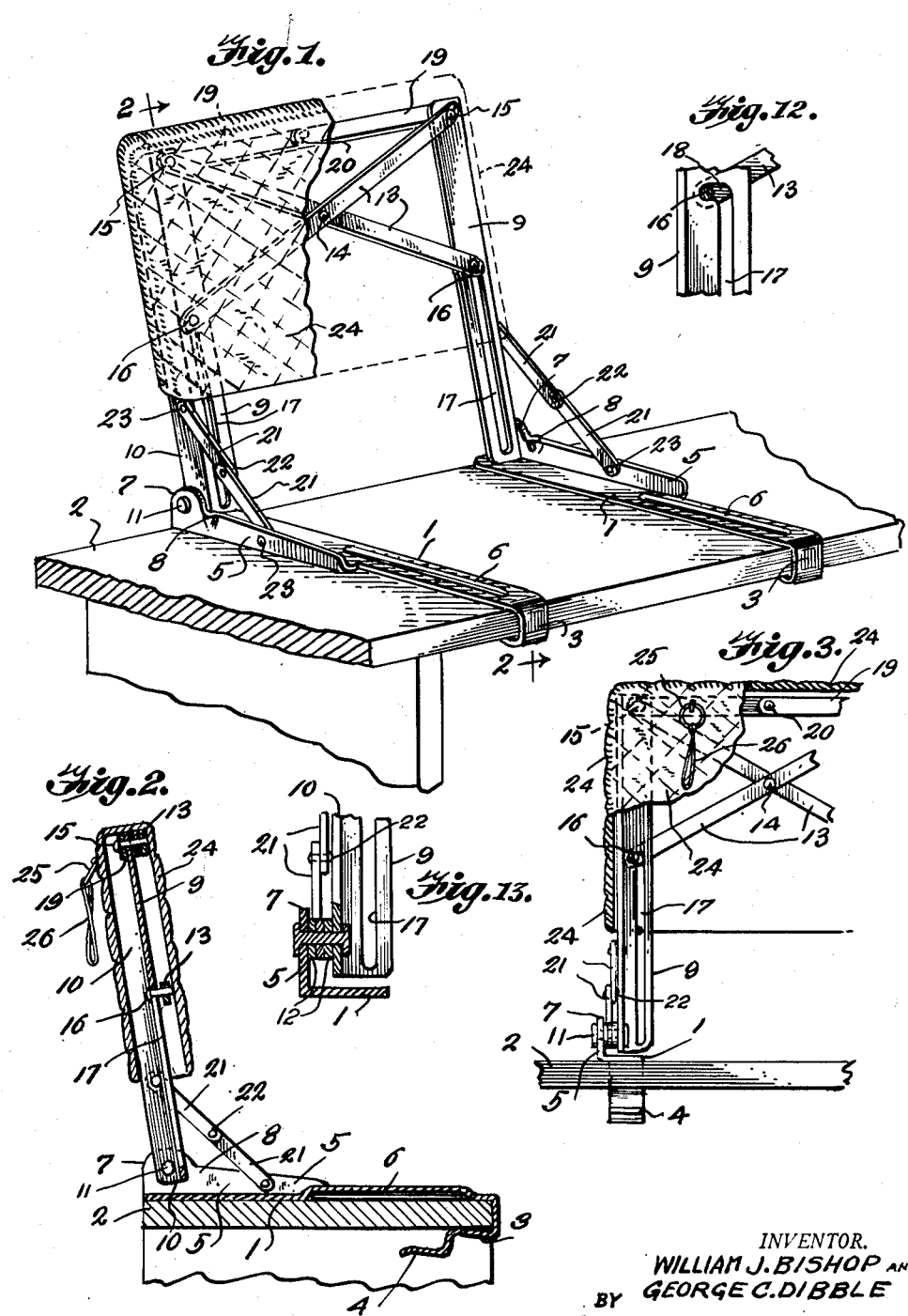

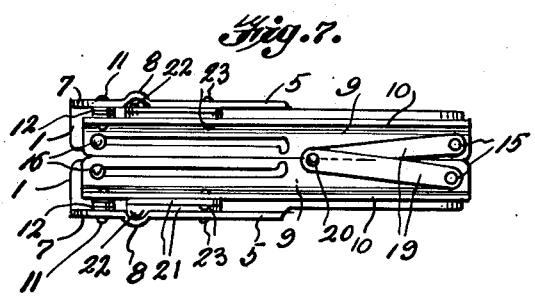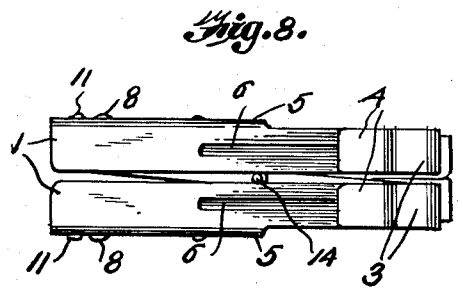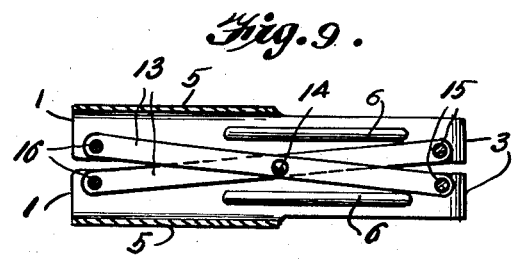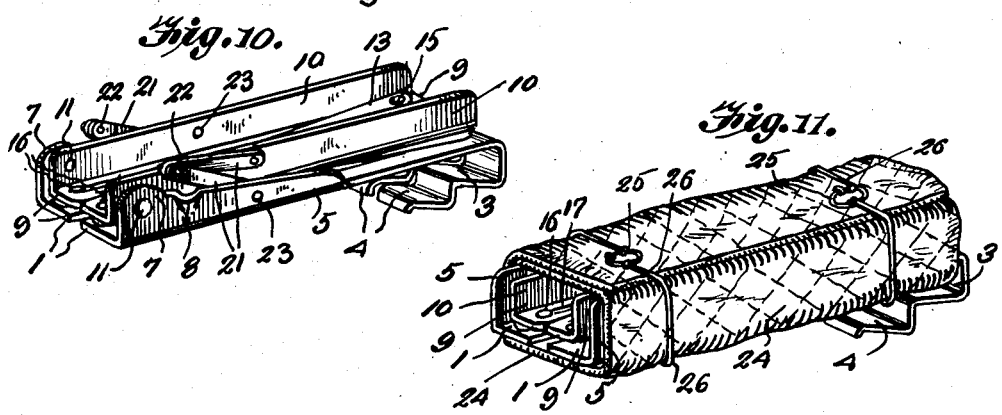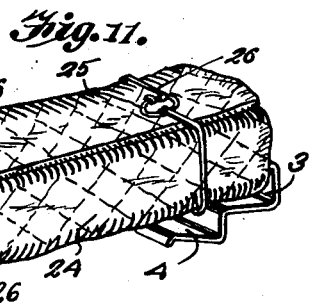

Patented Aug. 4, 1953

2,647,563

UNITED STATES PATENT OFFICE 2,647,563

COLLAPSIBLE BLEACHER TYPE BACK REST

William J. Bishop and George C. Dibble, Logansport, Ind.

Application January 8, 1951, Serial No. 204,962

1 Claim. (Cl. 155—133)

This invention relates to back rests and it is one object of the invention to provide a back rest of such construction that it may be removably applied to a grandstand seat, of the bleacher type, and serve as a comfortable back rest for a person watching a ball game, rodeo, or other performance.

Another object of the invention is to provide a back rest which is formed of metal strips so connected with each other that the back rest may be folded into a compact mass when not in use and conveniently carried in a person's hand or in a pocket.

Another object of the invention is to so form the back rest that when it is to be used its elements may be easily and quickly spread to an extended position and form a back rest which will not be liable to collapse or slide out of its proper position upon a bench or seat.

Another object of the invention is to provide a back rest having side bars so formed that hooks forming portions thereof may be forced under a front edge portion of a seat and firmly grip the seat.

Another object of the invention is to provide the collapsible back rest with a fabric cover which may be readily applied to its back-engaging portion as a padding and also used as a wrapper in which the folded back rest may be rolled and rubber bands carried by the cover applied to hold it about the folded back rest.

Another object of the invention is to provide a foldable back rest formed of metal strips which are of light weight but of such strength that they are not liable to be bent out of shape.

Another object of the invention is to provide a foldable back rest which is of such construction that it may be manufactured at low cost and sold at a reasonable price.

This invention is illustrated in the accompanying drawings wherein:

Fig. 1 is a perspective view showing the improved back rest applied to a grandstand seat or bench, a portion of its fabric cover being broken away but indicated by dotted lines.

Fig. 2 is a vertical sectional view taken along the line 2—2 of Figure 1.

Fig. 3 is a rear view of a portion of the improved back rest.

Fig. 4 is a top plan view of the back rest with the back-engaging portion in a lowered position.

Fig. 5 is a side elevation of Figure 4.

Fig. 6 is a bottom plan view of the back rest showing the back-engaging portion in its lowered position.

Fig. 7 is a view looking down upon the folded back rest.

Fig. 8 is a bottom plan view of the folded back rest.

Fig. 9 is a sectional view taken longitudinally through the folded back rest.

Fig. 10 is a perspective view of the folded back rest.

Fig. 11 is a perspective view showing the folded back rest wrapped in the fabric cover or pad.

Fig. 12 is a fragmentary view showing the braces for the back-engaging portion are held against slipping downwardly when the back rest is in use.

Fig. 13 is a fragmentary view showing portions of the back rest in transverse section and other portions in elevation.

Fig. 14 is a fragmentary view showing the manner in which a base bar of the back rest grips a grand stand seat or bench which is thicker than that shown in Figure 6.

Fig. 15 is a fragmentary sectional view taken along the line 15—15 of Figure 5.

Fig. 16 is a transverse sectional view taken along the line 16—16 of Figure 15.

This improved foldable back rest is formed entirely of metal, except its cover or wrapper, and has base bars 1 of such length that they will extend across the seat or bench 2 of a grandstand to which the back rest is removably applied. Front end portions of the metal strips or bars from which the base members are formed are bent downwardly and then rearwardly to form hooks 3 of such depth that they may be forced rearwardly into place under the seat 1, and as the base bars are formed of resilient metal the hooks will grip the seat and prevent the bars from accidently slipping out of their proper engagement with the seat. After the metal bars have been bent to form the hooks 3 the bills of the hooks are bent downwardly and rearwardly to form auxiliary hooks 4 which are spaced downwardly from a seat of the thickness shown in Figures 2 and 5 but grip a seat of the thickness shown in Figure 14. Rear portions of the base bars are formed with upwardly projecting flanges 5 along their outer side edges, and in order to strengthen portions of the base bars which project forwardly from these flanges the bars are stamped to form upstanding reinforcing ribs 6. The flanges 5 gradually increase in depth towards their rear ends and at their rear ends are formed with upstanding ears 7, portions of the flanges immediately in front of the ears being bent outwardly to form recesses or pockets 8.

The back-engaging portion of the back rest is also formed of metal strips or bars and has side bars 9 which are formed of angle metal and have rearwardly projecting flanges 10 along their outer side edges. The side bars 9 are of the same length as the base bars 1 and pivotally connected therewith by pins 11 which pass through aligned openings formed in the flanges 10 and the ears 7 and carry washers 12 serving as spacers which hold the flanges 10 of the side bars 9 in spaced relation to the flanges 5 of the base bars 1, thus allowing the back-engaging member to be readily swung downwardly to a folded position or upwardly to a raised or extended position for use. Bracing bars 13 which are straight throughout their length are pivotally connected with each other midway their length by a pin 14 and have their upper ends pivotally connected with upper end of the side bars 9 by pins 15. Pins 16 pass through lower ends of the braces 13 and slidably pass through slots 17 which are formed longitudinally in lower portions of the side bars 9 and have side extensions or recesses 18 projecting from their upper ends towards outer side edges of the side bars. Additional bracing bars or strips 19, which are straight throughout their length and extend inwardly and transversely from the side bars 9 when the back-engaging member is raised, have their outer ends pivoted to the side bars by the pins 15 and their inner ends pivotally connected in overlapped engagement with each other by a pin 20. A suitable number of washers are placed where needed upon the pins 15 and 16 to hold the strips 13 and 19 straight and allow them to turn easily about the pins. The upper bracing strips serve to limit movement of the side bars away from each other beyond the position shown in Figure 1 and when the pins 16 are engaged in the recesses 18 the braces 13 will be prevented from moving downwardly through the slots 17. Therefore the back rest will be releasably held in its spread condition when extended and applied to a grandstand seat in position for use. Links 21 which have inner ends pivotally connected with each other by pins 22 and have their outer ends pivotally connected with the flanges of the base bars 1 and the side bars 9 form braces of the toggle joint type which limit swinging movement of the back-engaging member upwardly and rearwardly beyond the upright position shown in Figure 1. As the flanges 5 of the base bars are formed with the recesses or pockets 8, the back portion of the back rest may be swung forwardly and downwardly to the lowered position without the pins 22 striking upper edges of the flanges 5 and interfering with movement of the back portion to a fully lowered position.

When the back rest is in use it is desired to have the back portion covered and thus caused to be more comfortable and also prevented from catching portions of a coat or dress and causing the same to be torn or soiled. In order to do so there has been provided a cover or shield 24 which is formed of soft quilted material and consists of inner and outer layers and a soft padding, the inner layer being preferably cheesecloth and the outer layer a thin waterproof material. This cover is open along its lower edge so that it may be slid downwardly about the raised back portion of the back rest and its depth is such that its lower edge is disposed close to the diagonal braces 21. Rings 25 are sewed to the rear wall of the cover near the upper edge thereof and these rings carry rubber bands 26 which are readily replaceable if they are broken. When the back rest is in its folded condition the cover is wrapped about it, as shown in Figure 11, and secured by the rubber bands. It will thus be seen that the cover serves as a wrapper for the folded back rest as well as serving as a shield and as padding for the back portion during use of the back rest.

Having thus described the invention, what is claimed is:

A portable back rest for a bench comprising base bars having front ends bent downwardly and rearwardly and thereby formed with seat-engaging hooks said base bars having flanges projecting upwardly along outer side edges of their rear portions, and a back supporting member including side bars having lower ends pivoted to rear ends of the flanges of said base bars for forward and rearward swinging movement to folded and raised positions, said side bars having rearwardly extending flanges along their outer side edges, lower portions of the said side bars being formed with longitudinally extending slots having laterally extending recesses at their upper ends, braces pivoted to each other midway their length and having upper ends pivoted to upper ends of said side bars, pins projecting from lower ends of said braces and passing through said slots and slidable in the slots to permit movement of the side bars towards and away from each other and being engageable in said recesses, strips extending between upper ends of the side bars and having inner ends pivoted to each other and outer ends pivoted to the said upper ends of the side bars, and break joint braces consisting of upper and lower strips pivoted at inner ends to each other, the lower strips being pivoted at outer ends to the flanges of the base bars the upper strips having outer ends pivoted to the rearwardly extending flanges of the side bars in upward spaced relation to lower ends of the said side bars.

WILLIAM J. BISHOP.
GEORGE C. DIBBLE.

References Cited in the file of this patent

UNITED STATES PATENTS

| Number | Name | Date |
| --- | --- | --- |
| 1,721,366 | Backstrom | July 16, 1929 |
| 1,814,408 | Polleys | July 14, 1931 |
| 2,089,090 | Di Giacomo et al. | Aug. 3, 1937 |
| 2,324,570 | Figgins | July 20, 1943 |
| 2,518,971 | Zillig | Aug. 15, 1950 |
| 2,542,820 | Legois | Feb. 20, 1951 |